C. P. MARYE.
TAP.
APPLICATION FILED MAY 29, 1914. RENEWED MAY 25, 1916.
1,210,508.  Patented Jan. 2, 1917.
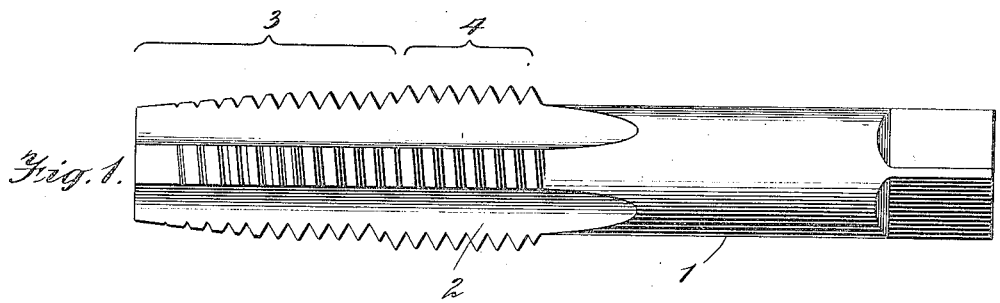
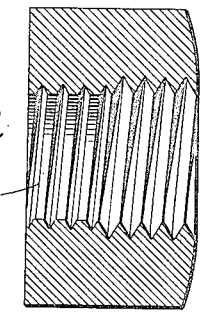 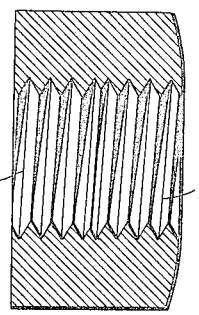
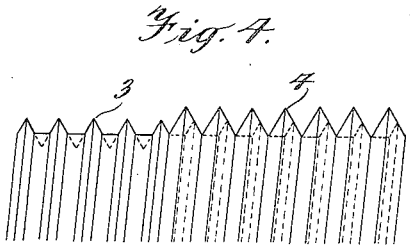
Witnesses:  Inventor
Clifford P. Marye
By his Attorneys

UNITED STATES PATENT OFFICE.

CLIFFORD P. MARYE, OF SOUTH WHITLEY, INDIANA, ASSIGNOR OF ONE-THIRD TO WILLIAM A. ROSENBAUM, TRUSTEE, OF NEW ROCHELLE, NEW YORK.

TAP.

1,210,508.  Specification of Letters Patent.  Patented Jan. 2, 1917.

Application filed May 29, 1914, Serial No. 841,762. Renewed May 25, 1916. Serial No. 99,918.

*To all whom it may concern:*

Be it known that I, CLIFFORD P. MARYE, a citizen of the United States, residing at South Whitley, in the county of Whitley and State of Indiana, have invented certain new and useful Improvements in Taps, of which the following is a full, clear, and exact description.

This invention relates to taps for thread cutting purposes, the object being to provide a tap adapted especially for cutting the thread in nuts of the character described in my application for Patent Serial No. 756,282, filed March 24, 1913, or for cutting a thread of a similar character in any article or object where it may be useful or desired. The nut referred to in my said application is a self-retaining nut in which the thread is divided into two sections succeeding each other along the bore of the nut, the threads of each section being the counterpart of those of the other, but the two sections being bodily offset toward or away from each other in an axial direction a fraction of the width of one thread, whereby the two sections will be out of helical alinement at the colliding or middle point of the nut. When such a nut is screwed upon a bolt having a uniform thread, it will run freely thereon until the second section of thread in the nut, encounters the thread on the bolt, whereupon further movement of the nut will have to be accomplished by considerable force which may be applied through the usual wrench. This force is necessary because of the friction set up by reason of the offset relation between the two sections of the thread in the nut and it is sufficient to prevent the nut from unscrewing or backing off when once it has been set up to its work. Some difficulty is encountered in providing a tool for cutting this peculiar thread in the nut, at a cost which will render the manufacture of the nut commercially practicable. The present invention provides such a tool and the same will now be described in detail with reference to the accompanying drawing, in which:

Figure 1 is a side elevation of my improved tap; Figs. 2 and 3 are sectional views of a nut in two different stages of its manufacture and adapted to be made with the tool shown in Fig. 1; Fig. 4 is a diagram representing clearly the relation between the threads on different parts of the tap.

The tap consists of the usual shaft or pin 1, having the longitudinal clearance grooves 2 separating the cutting threads into a number of lines as usual in the ordinary tap. The cutting threads of this tap are arranged in two sections, one of which is the advance section 3 and the other the finishing section 4. The tap is tapered generally throughout as usual and the advance section 3, as a body, is of less diameter than the finishing section 4 so that its threads will cut only a shallow thread which will subsequently be finished by a deeper cut produced by the finishing threads 4. All of the threads, or convolutions throughout the length of the tap, are of substantially the same character as to pitch, and so forth. The essential difference between the two sections 3 and 4 of the cutting threads is that they are bodily offset toward or away from each other in an axial direction, the fraction of the width of one convolution of thread, so that the threads of one section are out of helical alinement with those of the other. In the instance shown, this offsetting of the sections is in a direction toward each other as illustrated particularly in Fig. 4. In this figure the threads 3 are shown in the location they would occupy if continued along the zone of the threads 4 and the threads 4 are shown as being built up from one side only of the threads 3, thus throwing them toward the center and out of helical alinement with the threads 3. The section 4 may be offset in a direction away from section 3 by building up on the opposite side of the threads 3 from that shown in Fig. 4.

Such a tap is used in cutting the thread in the nut described in my pending application, by first passing the tap into the smooth bore of the nut and working it along until the forward end of the section 4 of the thread on the tap reaches substantially the middle point of the nut, whereupon the tap is withdrawn and passed into the opposite side of the nut until the forward end of section 4 of the thread has reached the middle point of the nut. In the first operation the section 3 of thread on the tap cuts a partially formed thread of the character shown at 5 throughout the bore of the nut and when the section 4 of the tap enters the nut, it is compelled to not only cut a deeper and finished thread, but to cut that thread by removing the surface from one face only of the thread 3 up to the point where the tap is stopped. In other words, assuming, for illustration, that the thread shown in Fig. 4 represents the thread cut in the nut by the tap, it will be seen that in the finished section the threads are formed by removing the material on one face thereof and not by removing it equally from both faces of the thread. This is accomplished by reason of the fact that the tap is held to its work by the engagement between its advance section 3 and the walls of the nut and the fact that the finishing section 4 is offset or out of helical alinement with the advance section. In the second operation of the tap wherein it enters the nut from the opposite side, the advance section 3 travels freely along the unfinished thread 5 and serves to compel the finishing section 4 of the tap to cut away the opposite face of the unfinished thread 5. The tap is caused to traverse the bore of the nut in this direction until it collides with the finished thread formed in the first operation, whereupon the tap is backed out and the nut is completed as shown in Fig. 3. When thus completed, it will be seen that the two sections of thread represented by 6 and 7 of the finished nut will be offset from each other in an axial direction to double the extent of the offsetting between sections 3 and 4 of the tap. This is due to the fact that in cutting the first finished section in the nut, the offsetting is toward the center and in cutting the second finished section, the offsetting is likewise toward the center, thus doubling the total amount of the offsetting.

While I have described that the same tap may be used successively in performing the two operations upon the nut, it is evident that two separate taps may be used respectively for these operations.

It is obvious that it is not essential that the threads of one section of the tap shall immediately follow the threads of the other section, since a blank space can intervene between the two sections, if desired.

I claim:—

1. A tap provided with two sections of cutting threads arranged successively thereon, one section being bodily offset from the other a fraction of the width of one thread for the purpose set forth.

2. A tap provided with two sections of cutting threads each having the same pitch and arranged successively thereon, one section being bodily offset from the other a fraction of the width of one thread for the purpose set forth.

3. A tap provided with two sections of cutting threads arranged successively thereon, one section being bodily offset from the other a fraction of the width of one thread, the first section having convolutions of less diameter than that of the convolutions of the second section.

In witness whereof, I subscribe my signature, in the presence of two witnesses.

CLIFFORD P. MARYE.

Witnesses:
 WALDO M. CHAPIN,
 JOSEPH BUCKLEY.